United States Patent [19]

Hansen et al.

[11] Patent Number: 5,303,825
[45] Date of Patent: Apr. 19, 1994

[54] STORAGE ASSEMBLAGE FOR INDEX PRINT SHEETS AND CASSETTES

[75] Inventors: David E. Hansen, Fairport, N.Y.; William H. Valls, Harwinton, Conn.

[73] Assignee: Eastman Kodak Company, Rochester, N.Y.

[21] Appl. No.: 3,155

[22] Filed: Jan. 12, 1993

[51] Int. Cl.$^5$ .................. B65D 85/57; B65D 85/671
[52] U.S. Cl. ................... 206/232; 206/389; 206/455; 206/472
[58] Field of Search .............. 40/124, 124.1, 124.2, 40/124.4, 152, 152.1, 154, 156, 157, 158.1, 159, 159.2; 206/0.8, 0.81–0.84, 45.34, 216, 223, 225, 232, 333, 387, 389, 391, 409, 425, 444, 449, 450, 454–456, 457, 459.5, 461–483, 559–565, 581; 242/71, 71.1, 71.7; 281/21, 22, 26, 28, 31, 51; 434/429

[56] References Cited

U.S. PATENT DOCUMENTS

| | | | |
|---|---|---|---|
| 3,187,889 | 6/1965 | Sinclair | 206/65 |
| 3,262,454 | 7/1966 | Shillinger | 206/472 |
| 3,294,233 | 12/1966 | Hollinger | 206/65 |
| 4,120,399 | 10/1978 | Clarke | 206/474 |
| 4,378,068 | 3/1983 | Bell | 206/470 |
| 4,582,194 | 4/1986 | Karpiloff et al. | 206/44 |
| 4,588,321 | 5/1986 | Egly | 402/77 |
| 4,614,450 | 9/1986 | Neiman | 40/124.2 |
| 4,704,042 | 11/1987 | Eisen et al. | 40/159 |
| 4,936,462 | 6/1990 | Yuen | 206/457 |
| 4,957,205 | 9/1990 | Rose, Jr. | 206/444 |
| 4,965,948 | 10/1990 | Ruebens | 40/159 |
| 4,974,983 | 12/1990 | Givati | 206/232 |
| 5,161,907 | 11/1992 | Byrne | 206/455 |

FOREIGN PATENT DOCUMENTS 0228993 3/1959 Australia .................. 206/45.34

Primary Examiner—Jimmy G. Foster
Attorney, Agent, or Firm—Roger A. Fields

[57] ABSTRACT

A storage assemblage is disclosed for cassettes each of which contains an image bearing medium having recorded images and for index print sheets each of which has printed pictures that match the images on the image bearing medium in one of the cassettes. According to the invention, there is provided respective holders for the cassettes each of which includes connection means for securing the holder to one of the index print sheets and fulcrum means engageable to permit the holder and an index print sheet secured to it to be pivoted at said fulcrum means. A binder for storing the holders and the index print sheets includes fixed support means for releaseably engaging the fulcrum means of each of the holders to store the holders and the index print sheets inside the binder and to permit one of the holders and an index print sheet secured to it to be pivoted away from the others to view the index print sheet and to be released from engagement with the fixed support means to obtain a cassette from the holder.

3 Claims, 5 Drawing Sheets

STORAGE ASSEMBLAGE FOR INDEX PRINT SHEETS AND CASSETTES

CROSS-REFERENCE TO RELATED APPLICATIONS

Reference is made to commonly assigned copending applications Ser. No. 08/003,362 entitled PACKAGE FOR INDEX PRINT SHEET AND CASSETTE, and filed Jan. 12, 192 in the names, of D. E. Hansen and W. H. Valls and Ser. No. 08/003,171 entitled STORAGE ASSEMBLAGE FOR INDEX PRINT SHEETS AND CASSETTES, and filed Jan. 12, 1992 in the names of R. J. Blackman and D. E. Hansen.

BACKGROUND OF THE INVENTION

1. Field of the Invention

The invention relates to a storage assemblage for cassettes each of which contains an image bearing medium having recorded images and for index print sheets each of which has printed pictures that match the images on the image bearing medium in one of the cassettes.

2. Description of the Prior Art

Generally, a processing laboratory gives the customer a processed photographic negative film and photographs which are enlarged and printed from the film. The negative film is usually cut into several sections, each one containing the same number of negatives and inserted into an open-ended sheath or sleeve. Many customers store the photographs in an envelope (with the negatives), making it difficult to later find a particular photograph.

Index or contact print sheets have been proposed which make it easier to find a particular negative. An index print sheet has printed on it several rows of pictures that match the negatives. The pictures are numbered in accordance with numbering of the negatives.

A book-like container for the index print sheet, the negatives, and individual prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the index print sheet along a midline. This flexing can possibly damage the index print sheet. The cassette is stored in an interior pocket raised from the base. This arrangement makes the container rather bulky.

THE CROSS-REFERENCED APPLICATIONS

Cross-referenced application Ser. No. 08/003,362 discloses a package for a cassette containing an image bearing medium having recorded images and for an index print sheet having printed pictures that match the images on the image bearing medium. The package comprises an envelope for storing the index print sheet with its pictures visible and a holder for the cassette. Respective means are located on the envelope and the holder for engaging to affix the envelope and the holder to each other and for disengaging to release one from the other. Alternatively, the holder can be secured directly to the index print sheet rather than via the envelope.

Cross-referenced application Ser. No. 09/003,171 discloses an assemblage for cassettes each of which contains an image bearing medium having recorded images and for index print sheets each of which has printed pictures that match the images on the image bearing medium. The assemblage comprises one or more containers each of which includes a flat transparent cover and a flat back dimensioned to snugly hold an index print sheet between them with the pictures on the index print sheet visible through the cover. The back has a fulcrum extension projecting from one edge of the back, and a nest open at an inner side of the back to receive a cassette and which projects from an outer side of the back to hold the cassette out of the way of the index print sheet. A box has a support for the back of each container, a groove arranged to receive the nest of each container when the back of the container is laid against the support, and slot-like means adapted to receive the fulcrum extension of each container to support the container for pivoting about its fulcrum extension to lower its back onto the support and its nest into the groove.

SUMMARY OF THE INVENTION

A storage assemblage for cassettes each of which contains an image bearing medium having recorded images and for index print sheets each of which has printed pictures that match the images on the image bearing medium in one of the cassettes, said storage assemblage comprising:

respective holders for the cassettes each of which includes connection means for securing the holder to one of the index print sheets and fulcrum means engageable to permit the holder and an index print sheet secured to it to be pivoted at the fulcrum means; and a binder for storing the holders and the index print sheets including fixed support means for releaseably engaging the fulcrum means of each of the holders to store the holders and the index print sheets inside the binder and to permit one of the holders and an index print sheet secured to it to be pivoted away from the others to view the index print sheet and to be released from engagement with the fixed support means to obtain a cassette from the holder.

DETAILED DESCRIPTION OF THE PREFERRED EMBODIMENT

Figure 1:
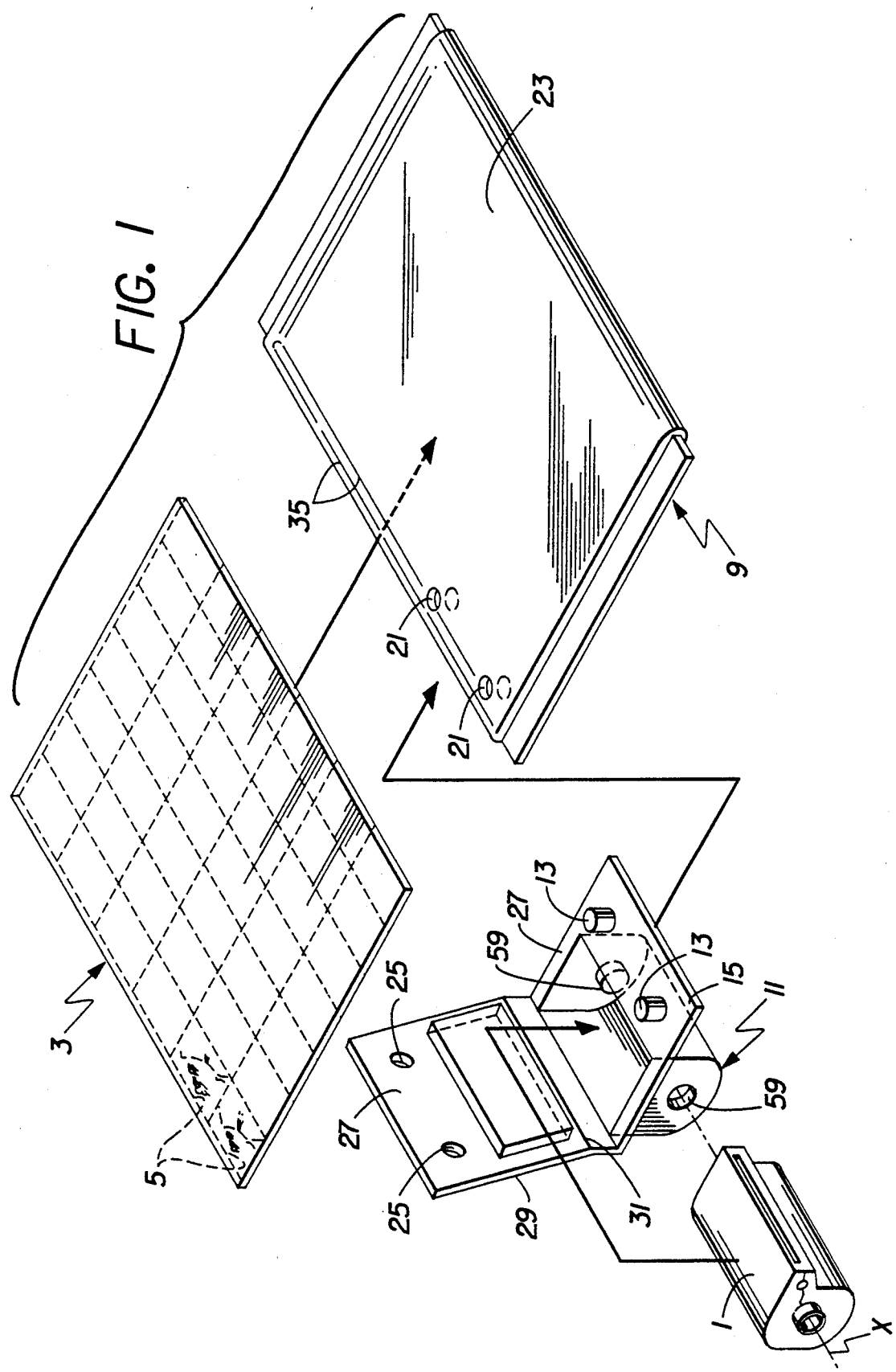
FIG. 1 is a perspective view of a holder for a cassette and an envelope for an index print sheet, showing how the holder is opened to receive the cassette, how the index print sheet is inserted into the envelope, and how the holder and the envelope are secured together.
Figure 2:
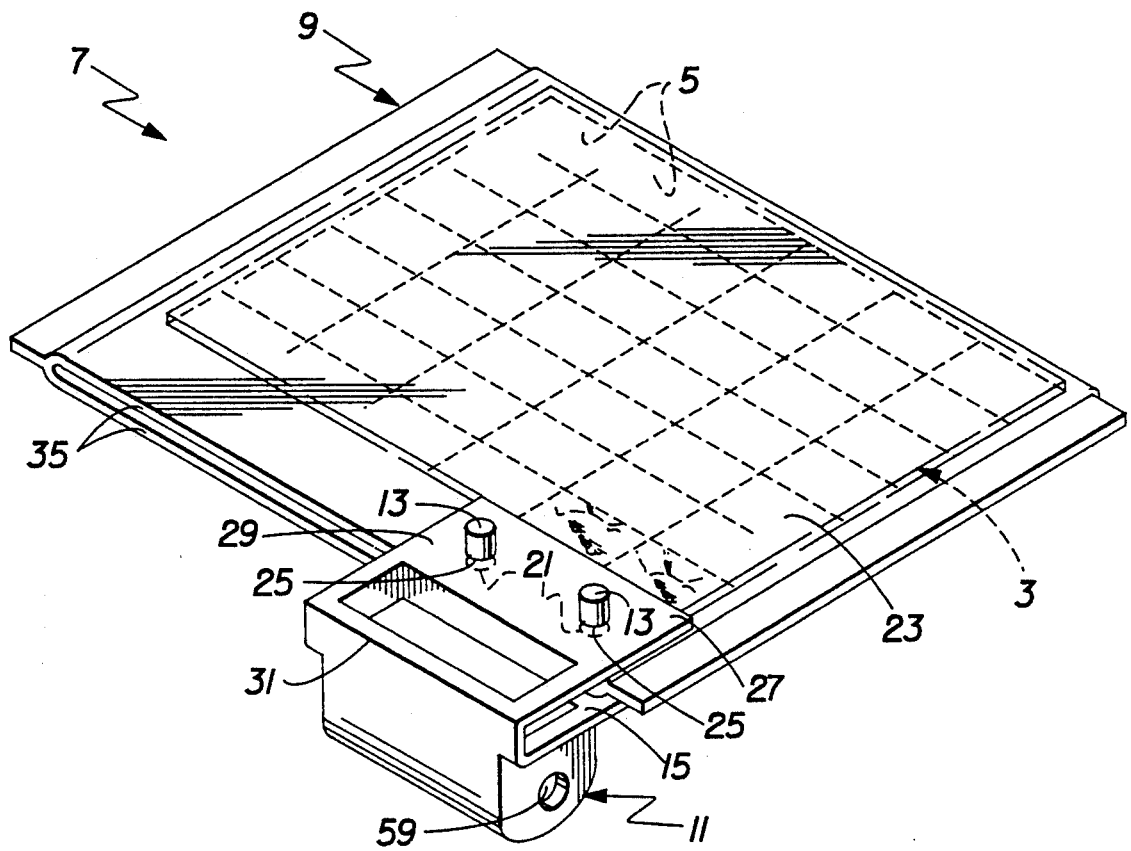
FIG. 2 is a perspective view of the holder with the cassette in it and the envelope with the index print sheet in it secured together.

Referring to FIGS. 1 and 2, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 holds a rolled filmstrip, not shown, having a series of successively numbered negatives.

An index print sheet 3 similar to the one disclosed in U.S. Pat. No. 4,966,285, issued Oct. 30, 1990, has a series of pictures 5 printed on its underside in FIGS. 1 and 2 that match the negatives on the filmstrip inside the cassette 1. The pictures 5 are numbered in accordance with numbering of the negatives.

Figure 3:
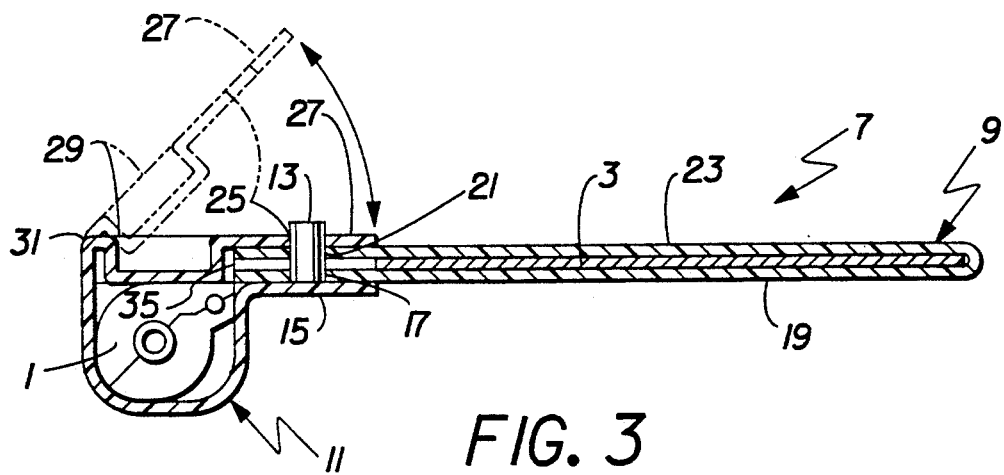
FIG. 3 is a sectional view similar to FIG. 2.

A package 7 for the cassette 1 and the index print sheet 3 is shown in FIGS. 1-3. The package 7 comprises a transparent page-like plastic envelope 9 for storing the index print sheet 3 with its pictures 5 visible through the envelope, and a transparent or opaque plastic holder 11 shaped similar to the shape of the cassette 1 to hold the cassette inside the holder. The holder 11 includes a pair of identical integral studs 13, 13 that project from a lip-like extension 15 of the holder through respective holes 17 (only one shown) in one side 19 of the envelope 9 and through respective holes 21, 21 in another side 23 of the envelope to affix the holder and the envelope to each other. See FIG. 3. Respective holes 25, 25 in a lip-like extension 27 of a cover portion 29 of the holder 11 receive the two studs 13 to secure the holder closed. An integral living hinge 31 of the holder 11 permits the cover portion 29 to be swung to open the holder.

The envelope 9 is open only along a longitudinal edge 35 to insert the index print sheet 3 between the two sides 19 and 23 of the envelope and to remove the sheet from the envelope. As shown in FIG. 3, the longitudinal edge 35 of the envelope 9 is located between the two lip-like extensions 15 and 27 of the holder 11 when the studs project through the respective holes 17 (only one shown) and 21, 21 in the two sides 19 and 23 of the envelope and through the respective holes 25, 25 in the cover portion 29 of the holder. Consequently, the index print sheet cannot be removed from the envelope 9.

Figure 4:
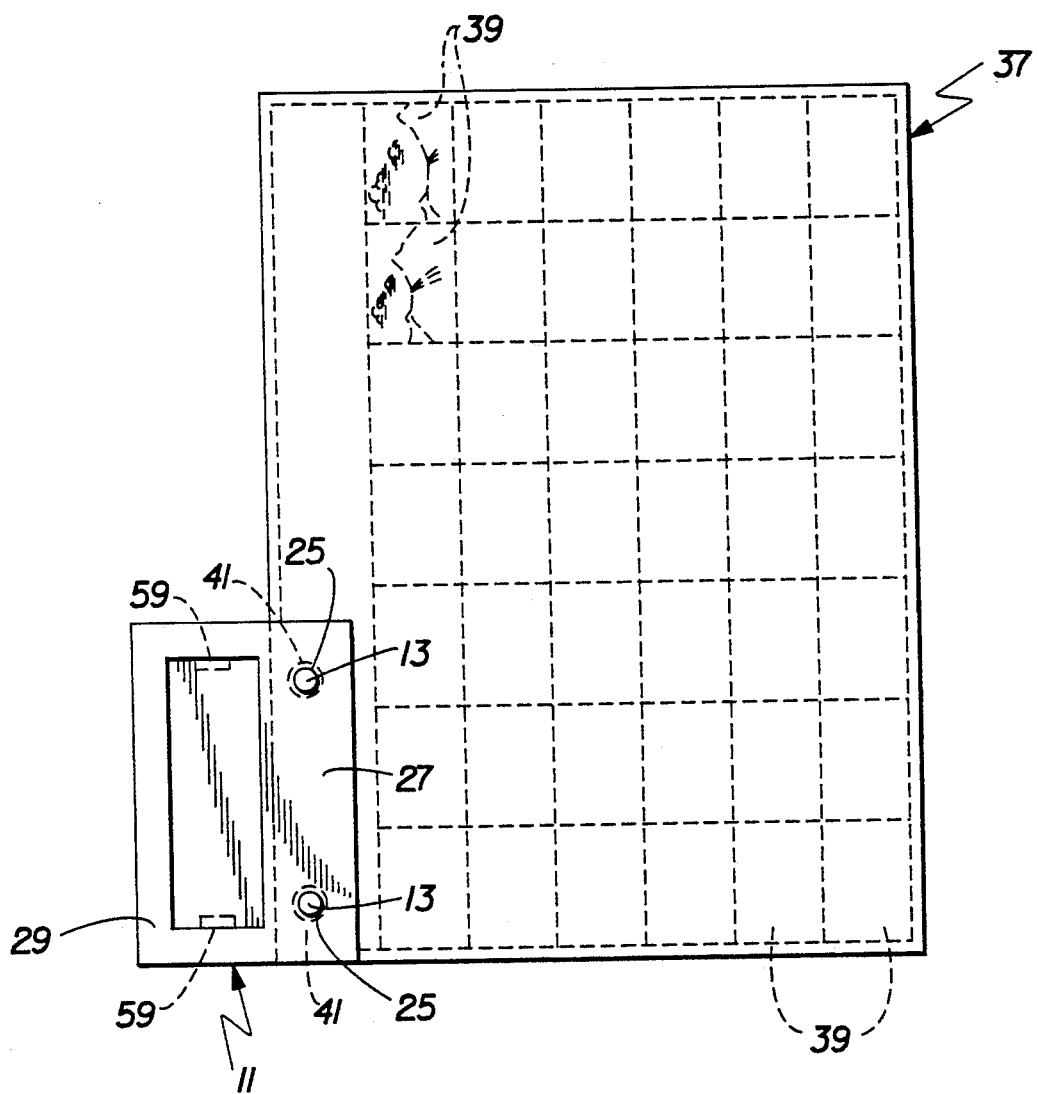
FIG. 4 is a top plan view of the holder with the cassette in it secured directly to the index print sheet rather than via the envelope.

Rather than securing the holder 11 to the index print sheet 3 via the envelope 9, the holder can be connected directly to an index print sheet 37 having a series of pictures 39 which are the same as the pictures 5 on the underside of the index print sheet 3. See FIG. 4. The index print sheet 37 has a pair of holes 41, 41 for receiving the respective studs 13, 13 of the holder 11 to connect the holder to the index print sheet similar to the way the holder is connected to the envelope 9 as shown in FIGS. 2 and 3.

Figure 5:
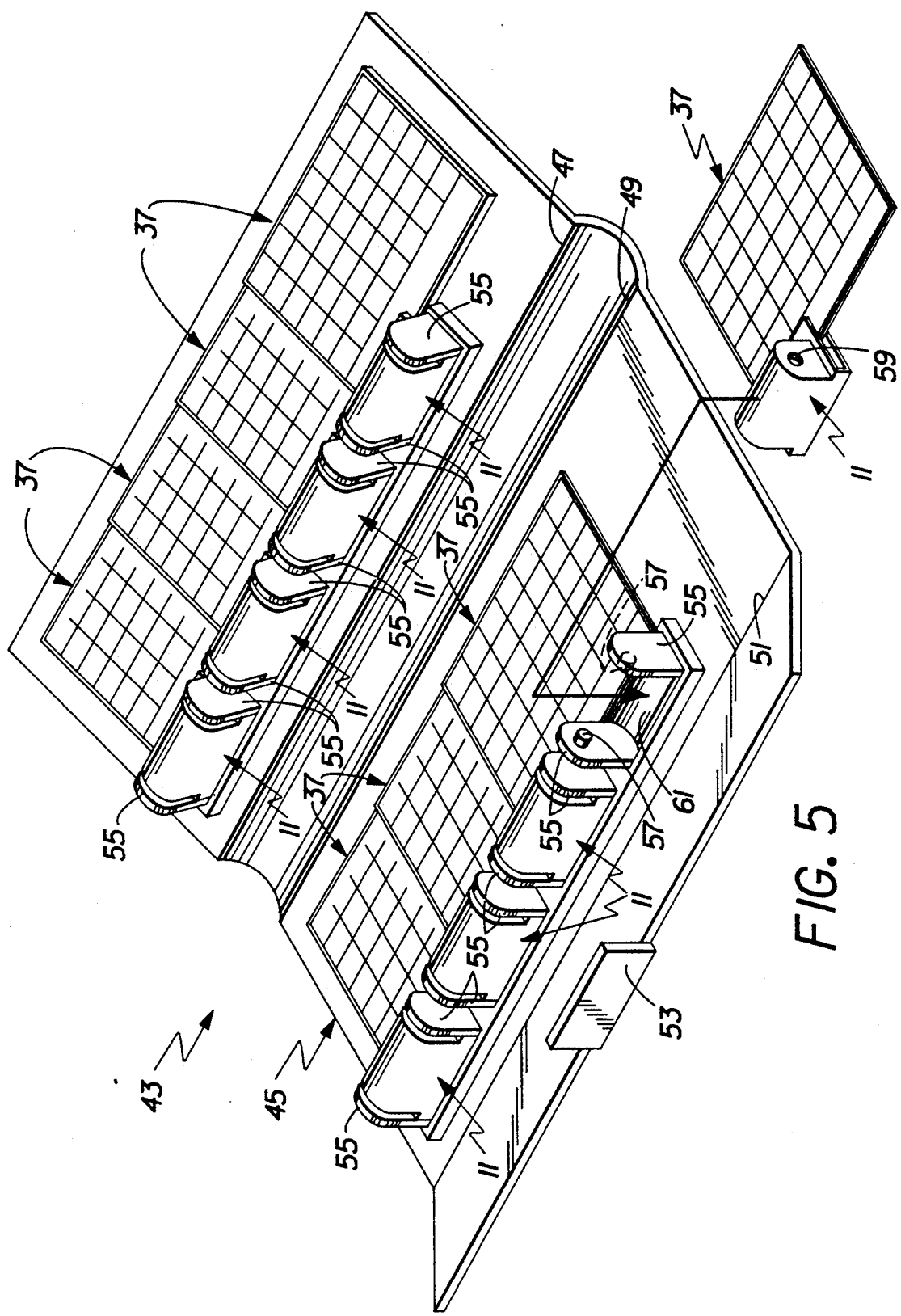
FIG. 5 is a perspective view of an assemblage according to a preferred embodiment of the invention.
Figure 6:
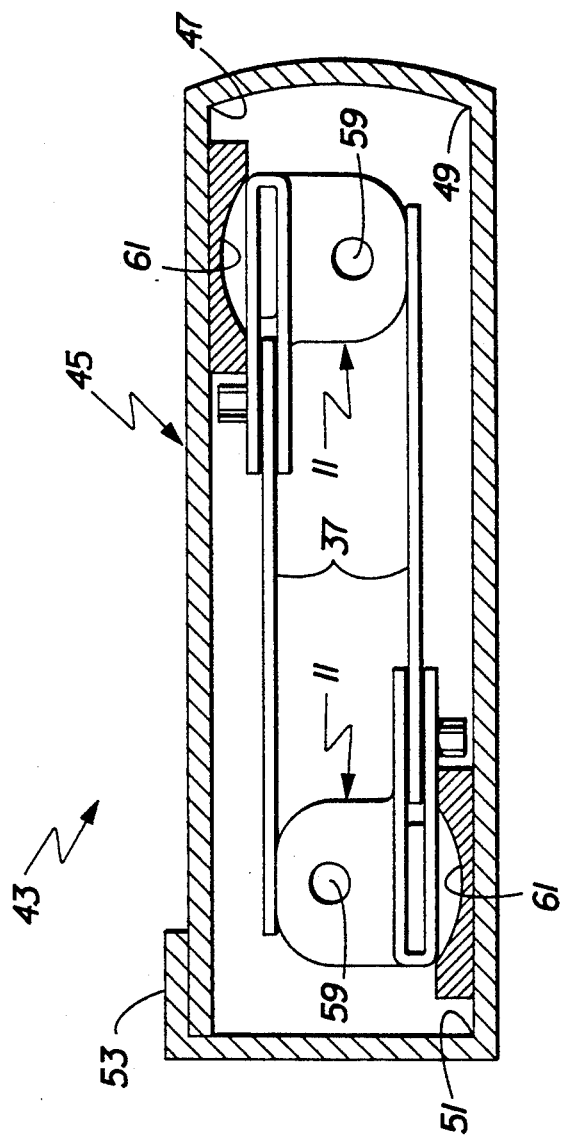
FIG. 6 is a sectional view of the assemblage.

A storage assemblage 43 comprising at least one holder 11 and a book-like binder 45 for storing the holder(s) with the index print sheet(s) 37 or, alternatively, with the envelope(s) 9 and the index print sheet(s) 3, is shown in FIGS. 5 and 6. The binder 45 has three integral hinges 47, 49, and 51 that permit the binder to be opened and closed. A known locking tab 53 releaseably locks the binder 45 closed at its outside as shown in FIG. 6. A number of pairs of brackets 55, 55 are fixed to the inside of the binder 45. Each pair of the brackets 55, 55 has a pair of facing pins 57, 57 which are received in respective end cavities 59, 59 in one of the holders 11 to support the holders side by side with the index print sheets 37 in successive partly-overlapping relation as shown in FIG. 5. The end cavities 59, 59 of each holder 11 are located in alignment with a spool axis X of a cassette 1 contained in the holder. See FIG. 1. The brackets 55 are resiliently deformable to remove the respective pins 57 from the individual cavities 59. Each pair of the facing pins 57, 57 permits one of the holders 11 and the index print sheet 37 to be pivoted away from the others to view the index print sheet and to be released from engagement with the pair of facing pins to obtain the cassette 1 from the holder. A clearance concavity 61 is located between each pair of the facing pins 57, 57 as shown in FIG. 5, to provide ample space for pivoting one of the holders 11 away from the others.

The invention has been described with reference to a preferred embodiment. However, it will be appreciated that variations and modifications can be effected within the ordinary skill in the art without departing from the scope of the invention.

We claim:

1. A storage assemblage for cassettes each of which contains an image bearing medium having recorded images and for index print sheets each of which has printed pictures that match the images on the image bearing medium in one of the cassettes, said storage assemblage comprising:

respective holders for the cassettes each of which includes connection means for securing the holder to one of the index print sheets and fulcrum means engageable to permit the holder and an index print sheet secured to it to be pivoted at said fulcrum means; and a binder for storing said holders and the index print sheets including fixed support means resiliently deformable for releaseably engaging said fulcrum means of each of the holders to store the holders and the index print sheets inside said binder and to permit one of the holders and an index print sheet secured to it to be pivoted away from the others to view the index print sheet and to be released from engagement with said fixed support means to obtain a cassette from the holder.

2. A storage assemblage as recited in claim 1, wherein said fixed support means is arranged to engage said fulcrum means of each of said holders to store the holders side by side with the index print sheets in successive partly-overlapping relation.

3. A storage assemblage for cassettes each of which contains an image bearing medium having recorded images and for index print sheets each of which has printed pictures that match the images on the image bearing medium in one of the cassettes, said storage assemblage comprising:

respective holders for the cassettes each of which includes connection means for securing the holder to one of the index print sheets and fulcrum means engageable to permit the holder and an index print sheet secured to it to be pivoted at said fulcrum means, and each of which is configured to hold one of the cassettes with a spool axis of the cassette located in alignment with said fulcrum means; and a binder for storing said holders and the index print sheets including fixed support means for releaseably engaging said fulcrum means of each of the holders to store the holders and the index print sheets inside said binder and to permit one of the holders and an index print sheet secured to it to be pivoted away from the others to view the index print sheet and to be released from engagement with said fixed support means to obtain a cassette from the holder.

* * * * *

UNITED STATES PATENT AND TRADEMARK OFFICE
CERTIFICATE OF CORRECTION

PATENT NO. : 5,303,825
DATED : April 19, 1994
INVENTOR(S) : Hansen et al

It is certified that error appears in the above-indentified patent and that said Letters Patent is hereby corrected as shown below:

In column 1, line 11, delete "Jan. 12, 192" and insert --Jan. 12, 1992--.

Signed and Sealed this

Thirtieth Day of August, 1994

Attest:

BRUCE LEHMAN

Attesting Officer

Commissioner of Patents and Trademarks